July 25, 1967 G. O. GESSEL 3,332,318

CHARACTER PROJECTION UNIT

Filed Sept. 20, 1965

INVENTOR.
GUY O. GESSEL

BY Christie, Parker & Hale
ATTORNEYS.

United States Patent Office 3,332,318

Patented July 25, 1967

3,332,318

CHARACTER PROJECTION UNIT

Guy O. Gessel, Encino, Calif., assignor to Industrial Electronic Engineers, Inc., Van Nuys, Calif., a corporation of California Filed Sept. 20, 1965, Ser. No. 488,374
8 Claims. (Cl. 88—24)

ABSTRACT OF THE DISCLOSURE

A rear projection display unit for selectively displaying one of a selection of characters. The unit provides a plurality of separate projection systems, one for each character in the selection. Each projection system includes a light source, collimating lens, character mask, and condensing lens arranged along axes converging toward the center of a display screen. In the preferred configuration, the individual collimating lenses and condensing lenses are formed into a collimating lens plate and a condensing lens plate respectively.

This invention relates to character projection units of the type employed for selectively displaying different characters on a projection screen and in particular to improvements in the lenses used with such units.

Character projection units are generally employed in large multiples, to display multi-digit numbers, words and other symbols. Typically, each projection unit incorporates a rectangular viewing screen which occupies a space in an overall panel display reserved for a single letter, digit or symbol. By selecting a particular number or letter to be projected by each unit, different multi-digit numbers and words may be displayed. Since each projection unit must be capable of displaying any of a relatively large selection of letters or numerals, as for example, the numerals zero through nine, its internal construction is, of necessity, somewhat complex. The complexity is compounded by a competing requirement of compactness resulting from the fact that the display units must be located close together so as to provide a conventional spacing between the digits and letters of multi-digit numbers and words.

The problem of compactness is solved to a great degree by the employment of lens plates which support the individual lenses of a multiplicity of converging projection systems as described in U.S. Patent 3,041,600. It is presently conventional in display units of the general type to provide a collecting lens, condensing lens and projection lens together with a light source and a character forming mask in each of a plurality of character projection systems. The objective in the design of these units is to achieve a maximum light intensity and resolution on the viewing screen.

I have now discovered that the quality of the image found on the screen of such a display device can be greatly improved by replacing the conventional high powered condensing lens with a pair of lenses the first (as arranged in the optical train from the light source) being a collimating lens and the second being a condensing lens of relatively lower power than the previously conventional condensing lenses and by interposing the character forming mask between the collimating and condensing lenses. The several collimating lenses and the several condensing lenses required to provide a plurality of optically separate projection system in a display unit are respectively conveniently supported on or formed integrally in lens plates with a simple lens plate providing the entire plurality of collimating lenses and a separate lens plate providing the totality of condensing lenses. Preferably, these lens plates are of a spherical configuration as described in the aforementioned patent U.S. 3,041,600.

Thus a complete display unit in accordance with my invention comprises a translucent viewing screen, a plurality of converging projection systems mounted behind the screen and including a plurality of light sources, a plurality of collimating lenses, a plurality of collecting lenses and a plurality of symbol forming masks constituting a separate light source, collimating lens, symbol forming mask and condensing lens arranged serially in the recited sequence in each of the plurality of projection systems. In preferred practice, a collecting lens is interposed between the light source and the collimating lens and a projection lens is interposed between the condensing lens and the translucent screen.

By providing a combination of collimating lenses and condensing lenses, the present invention illuminates the screen of the display apparatus with approximately twice the brightness of the typical prior art single condensing lens. In addition the new system has less distortion, requires less magnification and provides more even coverage of the projection screen. The reductions in distortion and uniformity of coverage is due to the use of separate collimating and condensing lenses thereby allowing the radii of curvature of these lenses to be substantially greater than the single condensing lenses of conventional display units. Furthermore splitting the condensing lens of the prior art also means it is possible to increase the size of the usable symbol forming mask area.

The improvement provided by the present invention will be better understood from the following description in conjunction with reference to the accompanying drawings, in which.

Figure 1:
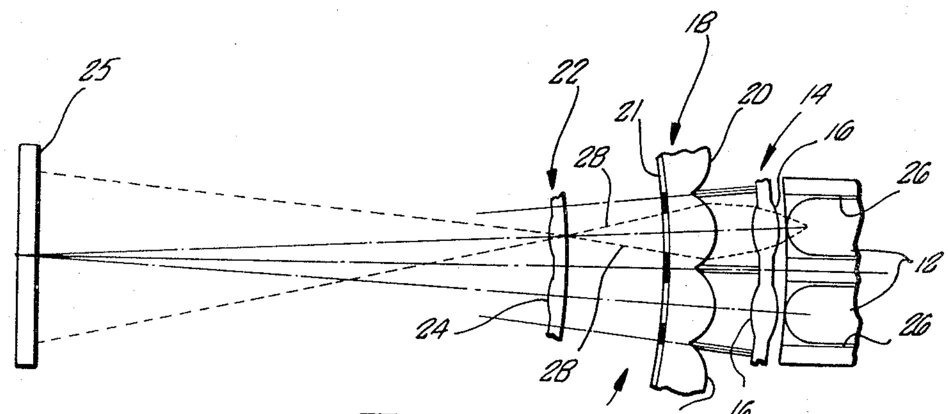
FIGURE 1 is a ray diagram which shows lens elements constructed and arranged in accordance with conventional practice.

Referring now to FIGURE 1 there is shown a prior art display unit. It comprises a plurality of light sources 12, a lens plate 14, having a plurality of light collecting lenses 16, a lens plate 18 having a plurality of high powered condensing lenses 20, a plurality of symbol forming masks 21, a third lens plate 22 having a plurality of objective lenses 24 and a translucent viewing screen 25 forming a plurality of converging projection systems for receiving and displaying symbols projected by the system. In the usual commercial display unit of this type, there may be from about ten to about twelve separate projecting systems requiring the respective number of bulbs 12, lenses 20, masks and objective lenses all focussed on the viewing screen.

The light sources 12 are a group of small lamps mounted in a corresponding plurality of sockets 26. Electrical connections are made to the individual lamps by means of electrical terminals (not shown) extending from the rear of the unit.

Located immediately in front of the light sources is the lens plate 14. This plate as well as plates 18 and 22 preferably has a curvature which is approximately spherical on radius from the center of the screen 25, it having previously been found that this is the optimum expedient for converging the several projection systems at the screen. A plurality of lenses 16 whose function it is to collect light from the source and focus the light on the condensing lenses are supported by the lens plate 14. In the embodiment shown, the lenses are formed integrally with the lens plate which is constructed of a transparent material.

Similarly, lens plate 18 supports a plurality of condensing lenses 20, and in the embodiment shown the condensing lenses are formed integrally with the plate which is constructed of transparent material. In order to provide sufficient brightness on the screen to permit the display to be read even under adverse conditions, such as bright sunlight, the individual lenses 20 are provided with a relatively small radius of curvature.

The function of lenses 20 is to concentrate the light collected by lenses 16 in the space defined by the symbol to be projected. In operation, light rays 28 from lens plate 16 are deflected immediately upon incidence upon the surface of lenses 20 producing a convergence of the rays. When rays 28 emerge from the front of plate 18, the distance between them is substantially reduced in comparison to the distance between them upon incidence at the rear of the plate. The distance between the rays upon emergence from the condensing lens determines the character or symbol format (mask character size) if the image presented on the screen is to be sharp.

Upon emergence from one of the lenses 20, the light passes through the selected symbol to a lens plate 22 supporting a plurality of projection lenses. The function of the lenses 24 in this plate is to center the symbol to be projected on the screen.

Figure 2:
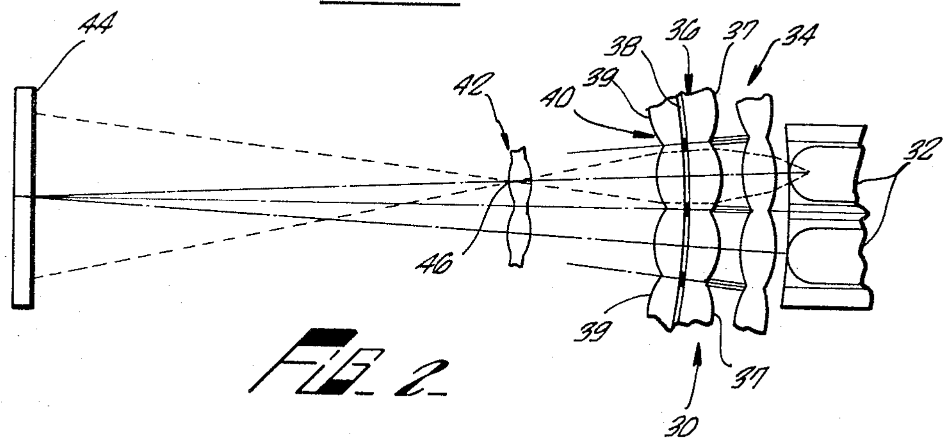
FIGURE 2 is a ray diagram which shows lens elements constructed and arranged in accordance with principles underlying the present invention.

The lens plate combination of the present invention is shown in FIGURE 2. In this figure a display unit 30 has a plurality of light sources 32, first lens plate 34, a second lens plate 36, a plurality of symbol forming masks 38, a third lens plate 40, a fourth lens plate 42 and a projection screen 44, this combination also forming a plurality of converging projection systems. Each of the lens plates is provided with a number of individual lenses which are supported by or formed integrally with their associated lens plates.

The construction and interrelationship of parts in unit 30 is similar to that of unit 10 in FIGURE 1 with the exception that a pair of lens plates 36 and 40 are provided to replace and better perform the function of the single condensing lens array (18) of the conventional prior art devices.

Examining the interrelation of the lens plates 36 and 40 in detail, lenses 37 in plate 36 have the function of collimating the light transmitted from plate 34. In contrast with the radius of curvature provided on the condensing lenses of the prior art, the lenses 37 are provided with a substantially greater radius of curvature. Instead of causing light rays incident on the surface thereof to converge, the radius of curvature now provided is sufficient only to bend the light rays incident upon the leading surface until they are approximately parallel. Thus a collimated rather than a condensed light beam is passed through the mask 38 and as a consequence the symbols in the mask may be as much as twice the size of those in the mask 21 of the prior art device with a proportionate increase in light transmission.

Upon emergence from the mask the light rays pass through condensing or doublet lenses 39 formed in plate 40 and upon emergence from this lens are condensed or converged toward a specific lens 46 in plate 42. Lens plate 42 is a projection lens plate having the same function as lens plate 22 in unit 10.

The combination of collimating lenses 37 and condensing lenses 39 permits the rays of light to pass through the film or format in a parallel pattern. This means that in comparison to the prior art approach there is now a substantially greater spread between light rays upon incidence with a symbol forming mask, the spread corresponding approximately to the distance between the rays upon incidence at the leading edge of plate 36.

In a typical system this means that the character format can have an area of .0361 square inch. In comparison the format for a comparable prior art system is .0182 square inch. The format of the present invention is thus approximately twice as large as that of the prior art thereby increasing the light gathering power of the system and yielding an image brightness on the screen which is twice that of the old system for lamps of the same power.

Because the converging function is now accomplished by a dual lens system, the radii of curvature of each of the dual lenses can be substantially increased. In addition to increasing image brightness, these larger radii also provide a reduction in distortion of the images projected on the screen and more even illumination of the projection screen.

Figure 3:
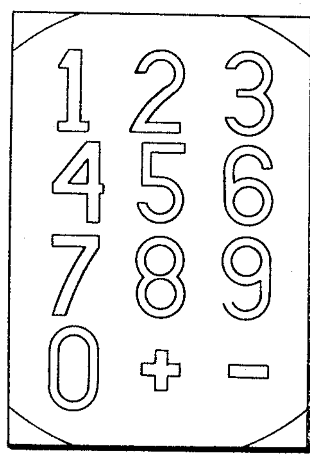
FIGURE 3 is a front view of a plurality of symbol forming masks for use with the display apparatus of the present invention.

A typical plural symbol forming mask 48 is shown in FIGURE 3. The mask represents the numerals from zero to nine and plus and minus symbols. Typically the masks constitute translucent characters printed on a film or any other opaque material in which a plurality of character forming objects are etched. The film is adapted to be located between the collimating and condensing lens plates of the system shown in FIGURE 2.

To further improve the compactness of the display units the collimating lenses 37 and condensing lenses 39 can be formed such that the perimeters of each individual lens has a polygonal or rectangular outline as described in copending application Ser. No. 443,750, filed Mar. 5, 1965, now U.S. Patent 3,244,071.

What is claimed is:

1. In a projection display apparatus having a translucent viewing screen and a plurality of converging projection systems mounted behind the screen for selectively projecting different characters onto the screen and including a plurality of light sources constituting a separate source for each projection system, the combination which comprises a plurality of collimating lenses, a plurality of character forming masks and a plurality of condensing lenses constituting a separate collimating lens, mask and condensing lens for each projection system and arranged serially in the recited order between the respective light source and the viewing screen.

2. In a projection display apparatus having a translucent viewing screen and a plurality of converging projection systems mounted behind the screen for selectively projecting different characters onto the screen and including a plurality of light sources constituting a separate source for each projection system, the combination which comprises a first lens plate disposed between the light sources and the screen and having an approximately spherical curvature on a radius from the center of the screen, a plurality of individual collimating lenses supported by the first lens plate, each collimating lens forming an optical element of a respective one of said converging projection systems, a second lens plate disposed between the first lens plate and the screen and having an approximately spherical curvature on a radius from the center of the screen, a plurality of individual condensing lenses supported by the second lens plate, each condensing lens forming an optical element of a respective one of said converging projection systems and means interposed between the first and second lens plate for forming light from the sources into a plurality of characters.

3. In a projection display apparatus having a translucent viewing screen and a plurality of converging projection systems mounted behind the screen for selectively projecting different characters onto the screen and including a plurality of light sources constituting a separate source for each system, the combination which comprises a first lens plate of transparent material disposed between the light sources and the screen and having an approximately spherical curvature on a radius from the center of the screen and including a plurality of individual collimating lenses formed integrally therewith, each collimating lens forming an optical element of a respective one of said converging projection systems, and a second lens plate of transparent material disposed between the first lens plate and the screen and having an approximately spherical curvature on a radius from the center of the screen and including a plurality of individual condensing lenses formed integrally therewith, each condensing lens forming an optical element of a respective one of said converging projection systems.

4. In a projection display apparatus having a translucent viewing screen and a plurality of converging projection systems behind the screen for selectively projecting different characters onto the screen and including a plurality of light sources, each of said plurality constituting a separate source for each projection system, the combination which comprises a first lens plate of transparent material disposed between the light source and the screen and having an approximately spherical curvature on a radius from the center of the screen and including a plurality of individual collimating lenses formed integrally therewith, each collimating lens forming an optical element of a respective one of said converging projection systems, a second lens plate of transparent material disposed between the first lens plate and the screen and having an approximately spherical curvature on a radius from the center of the screen and including a plurality of individual condensing lenses formed integrally therewith, each condensing lens forming an optical element of a respective one of said converging projection systems, a third lens plate of transparent material disposed between the first lens plate and the light sources and having an approximately spherical curvature on radius from the center of the screen and including a plurality of individual collecting lenses formed integrally therewith, each collecting lens forming an optical element of a respective one of said converging projection systems and means interposed between the first and second lens plate for forming light from the sources into a plurality of characters.

5. A projection display apparatus according to claim 4 including the additional element of a fourth lens plate of transparent material disposed between the screen and the second lens plate and having an approximately spherical curvature on a radius from the center of the screen and including a plurality of individual projection lenses formed integrally therewith, each projection lens forming an optical element of a respective one of said converging projection systems.

6. In a projection display apparatus having a rectangular translucent viewing screen adapted to be viewed from the front and a plurality of converging projection systems mounted within a confined volume behind the screen for selectively projecting different characters onto the screen from the rear and including a plurality of light sources constituting a separate source for each system, the combination which comprises a first lens plate of transparent material disposed between the light sources and screen and having an approximately spherical curvature on a radius from the center of the screen, and including a plurality of individual collimating lenses formed integrally with the plate material, each lens having an optical axis aligned with the axis of projection of a respective one of said converging systems, and each lens being in the form of a figure of revolution about its optical axis with the perimeter of the lens being chopped off on a plurality of sides so that the lens has an approximately polygonal outline and a second lens plate of transparent material disposed between the first lens plate and the screen and having an approximately spherical curvature on a radius from the center of the screen and including a plurality of individual condensing lenses formed integrally with the plate material, each lens having an optical axis aligned with the axis of projection of a respective one of said converging systems, and each lens being in the form of a figure of revolution about its optical axis with the perimeter of the lens being chopped off on a plurality of sides so that the lens has an approximately polygonal outline.

7. A projection system according to claim 6 wherein the individual collimating lenses and individual condensing lenses are chopped on four sides so that the lenses have an approximately rectangular outline.

8. A projection system according to claim 7 including a plurality of symbol forming masks disposed between the first and second lens plate, each mask forming a part of one of the plurality of individual projection systems.

References Cited

UNITED STATES PATENTS

| | | | |
|---|---|---|---|
| 3,041,600 | 6/1962 | Gumpertz et al. | 340—378 |
| 3,096,512 | 7/1963 | Hollowich | 340—378 |
| 3,244,071 | 4/1966 | Gumpertz | 88—24 |

NORTON ANSHER, *Primary Examiner.*

W. M. FRYE, *Assistant Examiner.*